United States Patent Office 2,844,554
Patented July 22, 1958

2,844,554

COMPOSITIONS CONTAINING DIISOCYNATE-LINKED POLYURETHANE ELASTOMER AND BEESWAX

Robinson F. Nichols, Cuyahoga Falls, and Leonard C. Kreider, Wadsworth, Ohio, assignors to The B. F. Goodrich Company, New York, N. Y., a corporation of New York No Drawing. Application January 3, 1955
Serial No. 479,642

3 Claims. (Cl. 260—28)

This invention relates to diisocyanate-linked elastomer compositions having improved processing characteristics and has particular reference to the incorporation of beeswax into glycol-based diisocyanate-linked condensation elastomers to improve processability thereof.

Diisocyanate-linked elastomers obtained by reaction of polyesters, polyesteramides, polyalkylene ether glycols and the like with organic diisocyanates are known. The diisocyanate-linked elastomers have many outstanding physical properties which makes their use in commercial operations very desirable. A critical deterrent to more widespread use of these elastomers is poor processing characteristics. Some of the elastomers are very tough and difficult to handle in normal rubber processing equipment. Many of them become sticky and soft and adhere to equipment surfaces. Others take up compounding ingredients very slowly and poor dispersions are obtained. Even those elastomers which are prepared from critical ratios of reactants, so that they may be handled in normal rubber processing equipment, have a very narrow temperature range of handling so that unless extreme precautions are taken and processing temperatures carefully controlled, difficulty is experienced in ordinary factory operations. Further, there are variations from batch to batch of the elastomers which further complicate the handling problem on a production basis.

Accordingly, it is an object of this invention to provide a diisocyanate-linked elastomer composition which may be processed on normal rubber processing equipment and into which pigments may be readily incorporated in a uniform dispersion. It is another object of this invention to provide a method whereby diisocyanate-linked elastomers are provided which have the necessary plasticity, tack, lack of nerve, a wide temperature range of processing characteristics and compatibility with compounding ingredients for successful factory handling. Still another object is to provide a method for improving the processing characteristics of a variety of unvulcanized, essentially linear diisocyanate-linked elastomers.

These and other objects are accomplished through the addition of a small amount of beeswax to diisocyanate-linked elastomers. Beeswax-containing diisocyanate-linked elastomers can be milled at temperatures above normal milling ranges whereby the elastomer loses its nerve completely; the elastomers become tough enough at higher temperatures so that satisfactory sheets can be made; the elastomers do not stick to mill rolls and other processing equipment surfaces but retain tackiness; pigments and vulcanizing agents can be incorporated readily in increased amounts at a rapid rate over a wide range of milling temperatures to provide stocks with a uniform dispersion of pigment therein; the processing temperature range of any given diisocyanate-linked elastomer is broadened considerably, allowing for normal variation in production process handling; and many elastomers which are too sticky or too soft to be handled in normal operations may be processed when beeswax is incorporated therein.

Quite surprisingly, beeswax in amounts as low as 0.05 weight part per 100 weight parts of elastomer results in improvement in the processing characteristics of the elastomer. Amounts from about 0.05 to 0.50 part are ordinarily sufficient to accomplish the objects of this invention and larger amounts, as high as 3 parts, may be employed but ordinarily are not necessary. Preferably about 0.1 to 1.0 part is employed. It is quite unexpected that such a low concentration of beeswax causes an improvement in processing characteristics of the diisocyanate-linked elastomers, since in ordinary rubber handling operations much larger amounts of processing aids are required.

The normal processing aids employed in rubber compounding, including pine tar, coal tar, paraffin wax, white factice, polyisobutylene, mineral rubber, stearic acid and the like do not improve the processing characteristics of diisocyanate-linked elastomers, and in most cases result in compositions which are even more difficult to handle than those which have had no processing aid added thereto.

The beeswax may be added to the diisocyanate-linked elastomer on the mill or in other processing equipment. By this technique the amount of beeswax necessary to improve the processing characteristics to the degree required for the specific operation involved such as milling, compounding, calendering and the like may be controlled. However, it is often desirable to have the beeswax present in the diisocyanate-linked elastomer prior to any processing steps and in such a case the beeswax may be added to the reactants employed in forming diisocyanate-linked elastomers.

The preferred beeswax is refined or bleached beeswax although the so-called crude beeswax is satisfactory. Adulterated beeswax is less desirable, particularly if it contains greater than about 50 percent adulterant, and the amount employed will be based upon the beeswax content of the mixture.

In addition to or in place of part of the beeswax, there may be used high molecular weight aliphatic esters of monobasic acids such as wool grease, methyl palmitate, hydrogenated vegetable oils, diglycol stearate and the like in amounts from about 0.5 to 2 parts. These additives result in some further improvement in processing characteristics of the diisocyanate-linked elastomer. It is understood, of course, that beeswax even in small amounts is quite superior to these additives which, however, may be used in conjunction therewith.

The diisocyanate-linked condensation elastomers and methods for their preparation are well known. U. S. Patents 2,432,148, 2,621,166, 2,625,531, 2,625,532 and 2,692,874 describe various methods of preparation. The diisocyanate-linked elastomers are known by a variety of names including Vulcaprene, Vulcollan, Estane G, Chemigum SL and Adiprene. Ordinarily a polyester, polyesteramide or polyalkylene ether glycol of a molecular weight from about 1000 to 2500 is reacted with an aromatic diisocyanate in a molar ratio such that ordinarily there is an excess of diisocyanate added. The resulting diisocyanate-linked elastomer is essentially a linear polyurethane which is cured or vulcanized by mixing with additional organic diisocyanate and heating, unless there is sufficient excess of diisocyanate initially mixed with the polyester or polyesteramide, in which case further heating and/or exposure to bifunctional additives causes curing or vulcanization. Where it is necessary to add additional diisocyanate in order to obtain a cure, and this is the most desirable technique, it is essential in order to obtain a good dispersion of the diisocyanate in the elastomer and to prevent the batch from absorbing small, but injurious amounts of water, to mill the mixture at a high temperature. Further, many of the preferred diisocyanate vulcanizing agents are hard, crystalline materials with high melting points and high milling temperatures are essential to disperse them adequately. At the temperature required for milling, unless beeswax is employed, the elastomers become soft, sticky and difficult to handle, and poor dispersion of diisocyanate into the elastomer which usually results in cured products with less than optimum physical properties. However, when beeswax is incorporated into the defined elastomers, these problems are readily solved.

The polyesters are ordinarily formed by the condensation reaction of a dibasic aliphatic acid with a glycol, ordinarily a $C_2$ to $C_5$ glycol and a $C_4$ to $C_6$ dibasic acid. The polyesteramides are formed by the condensation of a dibasic aliphatic acid with a mixture of a glycol, an amino alcohol and/or a diamine. In the case of the amino alcohol or diamine the latter two ingredients ordinarily are present in the reaction mixture in an amount less than one-half the amount of glycol employed so that the major portion of the linkages in the polymer chain are ester linkages with a minor proportion of amide linkages being present.

The reaction product of the polyester, polyesteramide or polyalkylene ether glycol and aromatic diisocyanate is a rubbery material. There are many modifications of the chain-extending reaction of the basic polyester, polyesteramide or polyalkylene ether glycol with the aromatic diisocyanate such as the reaction being conducted in the presence of small amounts of glycols, diamines, water and the like.

Regardless of how the diisocyanate-linked elastomer is prepared, the addition of a small amount of beeswax to such elastomers results in a composition which has greatly improved processing characteristics.

In a typical embodiment of the invention an excess of ethylene glycol is reacted with adipic acid and the resulting hydroxyl (polyethylene adipate) having a molecular weight of about 1200 is mixed with about 0.3 mol of water and 1.25 mols of paraphenylene diisocyanate, reacted at about 110° C. for about thirty minutes, and then poured into a container and heated further for about two hours. This product is a snappy, transparent elastomer gum which will process on a two-roll mill at about 160° F. At lower mill roll temperatures the gum is nervy and difficult to handle and will not readily take up compounding pigments. At mill roll temperatures much higher than 160° F. the gum is soft, sticky, difficult to remove from the mill rolls and does not readily take up compounding pigments. When as low as 0.2 weight part of beeswax is added to 100 weight parts of the gum on a mill, the composition immediately loses most of its nerve, will readily take up pigments, may be milled at temperatures much higher than 160° F. without becoming sticky, will not adhere to the mill rolls at this temperature, and, quite unexpectedly, at the higher temperatures in the presence of beeswax the gum becomes tougher and easier to handle. Further, pigments such as carbon black are readily incorporated at a rapid rate in this composition if desired. The elastomer is mixed with further amounts of an aromatic diisocyanate such as 5 parts of 1,5-naphthylene diisocyanate per 100 parts of elastomer, which material is efficiently dispersed and the mixture is readily vulcanized on application of heat and pressure. The vulcanized stocks have tensile strengths as high as 6000 to 8000 pounds per square inch; the beeswax in no way interferes with the curing reaction and has no adverse affect upon the physical properties of he vulcanizate.

When similar elastomers are prepared by reacting a polybutylene ether glycol of a molecular weight of about 1500 with an excess of aromatic diisocyanate such as tolylene-2,4 diisocyanate, it is found that this elastomer, when milled at an elevated temperature, is a sticky, non-homogeneous material which is readily converted to a smooth, tough, non-sticky sheet when about 0.25 part of beeswax is added thereto.

We claim:

1. A composition of matter comprising a diisocyanate-linked condensation polyurethane elastomer obtained by reaction of a material selected from the group consisting of polyesters, polyesteramides and polyalkylene ether glycols with an organic diisocyanate having isocyanate groups as the sole reactive groups, and a small amount of beeswax to improve the processing characteristics of said elastomer.

2. The composition of matter of claim 1 wherein the beeswax is present in an amount from about 0.05 to 3 weight parts per 100 weight parts of elastomer.

3. A composition of matter comprising 100 weight parts of a diisocyanate-linked condensation polyurethane elastomer obtained by reaction of a material selected from the group consisting of hydroxyl terminated polyesters, polyesteramides and polyalkylene ether glycols of a molecular weight from about 1000 to about 2500 with an aromatic diisocyanate, and from about 0.1 to about 1.0 weight part of beeswax to improve the processing characteristics of said elastomer.

References Cited in the file of this patent

UNITED STATES PATENTS 2,760,953   Seeger _____ Aug. 28, 1956

OTHER REFERENCES

"Modern Synthetic Rubbers," by Barron (1949), published by Chapman & Hall, pages 250, 251 and 393.